US009967120B2

United States Patent
Wilkerson

(10) Patent No.: US 9,967,120 B2
(45) Date of Patent: May 8, 2018

(54) ULTRA LOW POWER WIDEBAND NON-COHERENT BINARY PHASE SHIFT KEYING DEMODULATOR USING FIRST ORDER SIDEBAND FILTERS WITH PHASE 180 DEGREE ALIGNMENT

(71) Applicant: Benjamin P. Wilkerson, Incheon (KR)

(72) Inventor: Benjamin P. Wilkerson, Incheon (KR)

( * ) Notice: Subject to any disclaimer, the term of this patent is extended or adjusted under 35 U.S.C. 154(b) by 0 days. days.

(21) Appl. No.: 15/522,814

(22) PCT Filed: Oct. 29, 2015

(86) PCT No.: PCT/KR2015/011489
§ 371 (c)(1),
(2) Date: Apr. 28, 2017

(87) PCT Pub. No.: WO2016/068614
PCT Pub. Date: May 6, 2016

(65) Prior Publication Data
US 2017/0338985 A1    Nov. 23, 2017

(30) Foreign Application Priority Data
Oct. 31, 2014   (KR) .................. 10-2014-0150798

(51) Int. Cl.
*H04L 27/233*   (2006.01)
(52) U.S. Cl.
CPC .................. *H04L 27/233* (2013.01)
(58) Field of Classification Search
CPC .................................................... H04L 27/233
See application file for complete search history.

(56) References Cited

U.S. PATENT DOCUMENTS 4,816,769 A * 3/1989 Ma .................. H03D 1/2254
329/315
2003/0174797 A1   9/2003 Grushin
(Continued)

FOREIGN PATENT DOCUMENTS

KR           100365982 B1    2/2003
KR     10-2013-0086494 A    8/2013
(Continued)

OTHER PUBLICATIONS

International Search Report dated Mar. 4, 2016 for corresponding application PCT/KR2015/011489.

*Primary Examiner* — Freshteh N Aghdam
(74) *Attorney, Agent, or Firm* — Hauptman Ham, LLP

(57) ABSTRACT

A BPSK demodulator circuit comprises: a sideband-separating and lower sideband signal-delaying unit which separates a modulated signal into a lower sideband and an upper sideband by a primary low pass filter and a primary high pass filter having a cut-off frequency as a carrier frequency, and which outputs an upper sideband analog signal and an analog signal delayed by ¼ of a cycle of the carrier frequency from a lower sideband analog signal; a data demodulating unit which demodulates digital data by means of latching, through a hysteresis circuit, an analog pulse signal appearing in accordance with the phase change part of a signal generated by the sum of the analog signals; and a data clock restoring unit which generates a data clock by using a data signal and a signal having the delayed lower sideband analog signal digitized through a comparator.

4 Claims, 3 Drawing Sheets

(56) References Cited

U.S. PATENT DOCUMENTS

2007/0047971 A1     3/2007   Ikeuchi
2010/0277234 A1*   11/2010   Luo ..................... A61N 1/3727
                                                                     329/307

FOREIGN PATENT DOCUMENTS

| KR | 10-1414288 B1 | 7/2014 | | |
|----|---------------|--------|---|---|
| KR | 10-1417593 B1 | 7/2014 | | |
| KR | 1415497 B1 * | 7/2014 | ........... | H04L 27/233 |
| KR | 101414289 B1 | 7/2014 | | |

* cited by examiner

ULTRA LOW POWER WIDEBAND NON-COHERENT BINARY PHASE SHIFT KEYING DEMODULATOR USING FIRST ORDER SIDEBAND FILTERS WITH PHASE 180 DEGREE ALIGNMENT

CROSS-REFERENCE TO RELATED APPLICATION

This application is entering into the National Phase of PCT Application No. PCT/KR2015/0111489, filed on Oct. 29, 2015, which claims priority from Korean Patent Application No. 10-2014-0150798, filed on Oct. 31, 2014 with the Korean Intellectual Property Office. The entire contents of which are hereby incorporated by reference into this application.

BACKGROUND OF THE INVENTION

1. Field of the Invention

The present invention relates to an ultra low power wideband non-coherent BPSK demodulation method, and the structure of their circuit to demodulate data to align the phase 180° difference between the output signal of $1^{st}$ order sideband filter that passes upper sideband and the delayed signal that is delayed with $\pi/2$ period of carrier frequency from the output signal of $1^{st}$ order sideband filter that passes lower sideband.

2. Background of the Invention

BPSK (Binary Phase Shift Keying) signal which is double sideband suppressed carrier signal is used with coherent BPSK demodulation method to synchronize by a carrier signal that is regenerated with an internal oscillator.

BPSK demodulation is basically used by COSTAS loop that is complicated circuit to consume a heavily power and to limit a transmission speed, because it uses a feed-back loop with internal oscillator. Non-coherent DPSK demodulation circuit to use an analog integrator and switched-capacitor units, is used with an internal oscillator and an analog integrator that are used heavy power consumption and complicated circuits to use large area in chip, and has a drawback to discard whole packet data even one error in the packet occurred.

According to a BPSK demodulation circuit, Korean registered patent KR-100365982 mentioned about a stable modulation and demodulation circuits to use synchronous signal generator in demodulation unit. According to PSK demodulation circuit, Korean registered patent KR-101414289 mentioned about a non-coherent demodulation method that has no internal oscillator.

SUMMARY OF THE INVENTION

According to an embodiment, the present invention relates to an ultra low power wideband non-coherent binary phase shift keying (BPSK) demodulation method, and the structure of their circuit.

The structure of the BPSK demodulation circuit comprises: a sideband separation and lower sideband signal delay unit for separating a modulated signal into a lower sideband and an upper sideband through a first order low pass filter and first order high pass filter in which a blocking frequency is same as a carrier frequency, and outputting an upper sideband analog signal and an analog signal delayed as much as ¼ period of a carrier frequency from a lower sideband analog signal; a data demodulation unit for demodulating digital data by latching a signal generated by a difference in the analog signals through a hysteresis circuit since a delayed lower sideband analog signal and an upper sideband analog signal are arranged with a phase 180° difference, wherein the signal generated by the sum of the analog signals is an analog pulse signal shown corresponding to a phase changing part of a BPSK modulation signal; and a data clock recovering unit for generating a data clock by using a data signal and a signal digitalized from the delayed lower sideband analog signal through a comparing unit.

DESCRIPTION OF ILLUSTRATIVE EMBODIMENT

Figure 1:
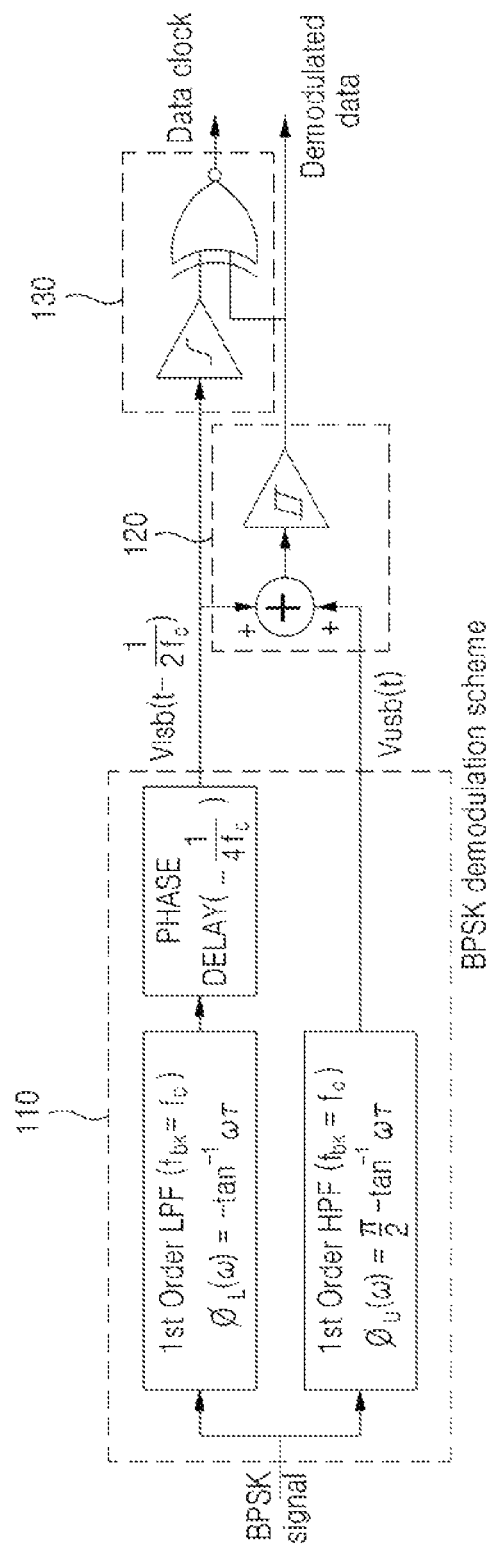
FIG. 1 is a circuit diagram to describe the structure of an ultra low power wideband non-coherent BPSK demodulator in accordance with an embodiment of the present invention.

According to the embodiment, the present invention provides BPSK demodulation circuit and its method to use aligning to phase 180° in the phase difference of $1^{st}$ order sideband filters for solving problems such as complicated circuit problem, transmission speed problem, and power consumption problem in conventional BPSK demodulation method.

Also, the present invention provides simple non-coherent BPSK demodulation circuit and their method to transmit wideband digital data in ultra low power.

According to the embodiment, the present invention provides an ultra low power non-coherent BPSK demodulation circuit which consists of a sideband separation and lower sideband signal delay unit, that separates lower sideband by $1^{st}$ order low-pass filter (LPF) with cutoff frequency same as carrier frequency and upper sideband by $1^{st}$ order high-pass filter (HPF) with cutoff frequency same as carrier frequency, and generates analog signal to be delayed from lower sideband analog signal with ¼ period or $\pi/2$ of carrier frequency; a data demodulation unit that demodulates digital data by latching positive pulse and negative pulse through a hysteresis circuit, because of aligning in phase 180° difference between above delayed lower sideband analog signal and above upper sideband analog signal; a data clock recovery unit that generates data clock using the data signal and digitized signal is from above delayed lower sideband analog signal by comparator.

According to one side, the sideband separation and lower sideband signal delay unit includes a $1^{st}$ order LPF to separate lower sideband analog signal and a $1^{st}$ order HPF to separate upper sideband analog signal, from the BPSK modulated signal.

Also, the unit includes a delay circuit to delay with preset phase from above lower sideband analog signal.

According to another side, the data demodulation unit includes an adder to generate the positive and negative pulses which appear in phase changing edge to be based on the sum of analog signals, because of aligning in phase 180° difference between above delayed lower sideband analog signal and above upper sideband analog signal.

Also, digital data signal is generated by Schmitt trigger which has hysteresis to latch analog pulse signal that is generated by the adder.

According to another side, the data clock recovery unit includes a comparator to digitize from above delayed lower sideband signal, and can synchronize by data clock signal is recovered by an exclusive-NOR with the input signals such as above digital data signal and the digitized signal by the comparator.

According to the embodiment, the present invention provides an ultra low power non-coherent BPSK demodulation method which consists of a sideband separation and lower sideband signal delayed stage, that separates lower sideband by $1^{st}$ low-pass filter with cutoff frequency same as carrier frequency and upper sideband by $1^{st}$ high-pass filter with cutoff frequency same as carrier frequency, and generates analog signal to be delayed from the lower sideband analog signal with ¼ period or π/2 of carrier frequency; a data demodulation stage that demodulates digital data by latching positive and negative pulses through the hysteresis circuit, because of aligning in phase 180° difference between above delayed lower sideband analog signal and above upper sideband analog signal; a data clock recovery stage that generates data clock signal is recovered by exclusive-NOR with the input signals such as recovered data signal and digitized signal is from above delayed lower sideband analog signal by comparator.

According to the embodiment, the present invention provides a simple non-coherent BPSK demodulation circuit and their method to transmit wideband digital data for consuming an ultra low power.

Not only that, the present invention provides the demodulation method to be applied in high speed digital and mobile communication systems which are required ultra low power consumption, and to be easily implemented in a low cost system on chip (SoC).

Below the embodiment, the present invention encompasses the details of the BPSK demodulation circuit topology and its method referring attached figures.

Referring now to FIG. 1, the circuit diagram of this invention for describing an ultra low power wideband non-coherent BPSK demodulation topology is shown in it. In the circuit same as in FIG. 1, the BPSK circuit is comprised of a sideband separation and lower sideband signal delay unit 110, a data demodulation unit 120, and a data clock recovery unit 130.

First of all, the outputs of a sideband separation and lower sideband signal delay unit 110 are an upper sideband analog signal and a phase delayed analog signal from a lower sideband analog signal, when a modulation signal for the input of the unit is separated to a lower sideband (LSB) and an upper sideband (USB) for sideband analog signals. In this case, the sideband separation is composed of $1^{st}$ order filters whose cutoff frequency is same as carrier frequency, and a lower sideband signal and an upper sideband signal are acquired by $1^{st}$ order low-pass filter and $1^{st}$ order high-pass filter, and a delay circuit to delay with preset phase from a lower sideband analog signal.

In this case, the lower sideband analog signal that is from the output of $1^{st}$ order filter, is occurred as slow as π/2 or ¼ period of carrier frequency rather than the upper sideband analog signal, and the delayed lower sideband signal is occurred through the delay circuit to delay π/2 or ¼ period of carrier frequency for finding phase changing edge with aligning phase 180° difference between the delayed lower sideband signal and the upper sideband signal.

Second of all, a data demodulation unit 120 consists of an adder to generate positive pulses and negative pulses to be occurred in phase changing edge by the difference of that aligns phase 180° difference between the delayed lower sideband signal and the upper sideband signal.

And it consists of a hysteresis circuit such as Schmitt trigger to demodulate digital data by latching an analog pulse signal that is from the adder, through the circuit of hysteresis.

Third of all, a data clock recovery unit 130 consists of the comparator and the exclusive-NOR gate that are shown in the figure.

In this case, a digitized signal is occurred in the output of the comparator when its input is set to above delayed lower sideband analog signal, and a data clock is discovered through the function of an exclusive-NOR with the digitized signal and above demodulated data signal.

Figure 2:
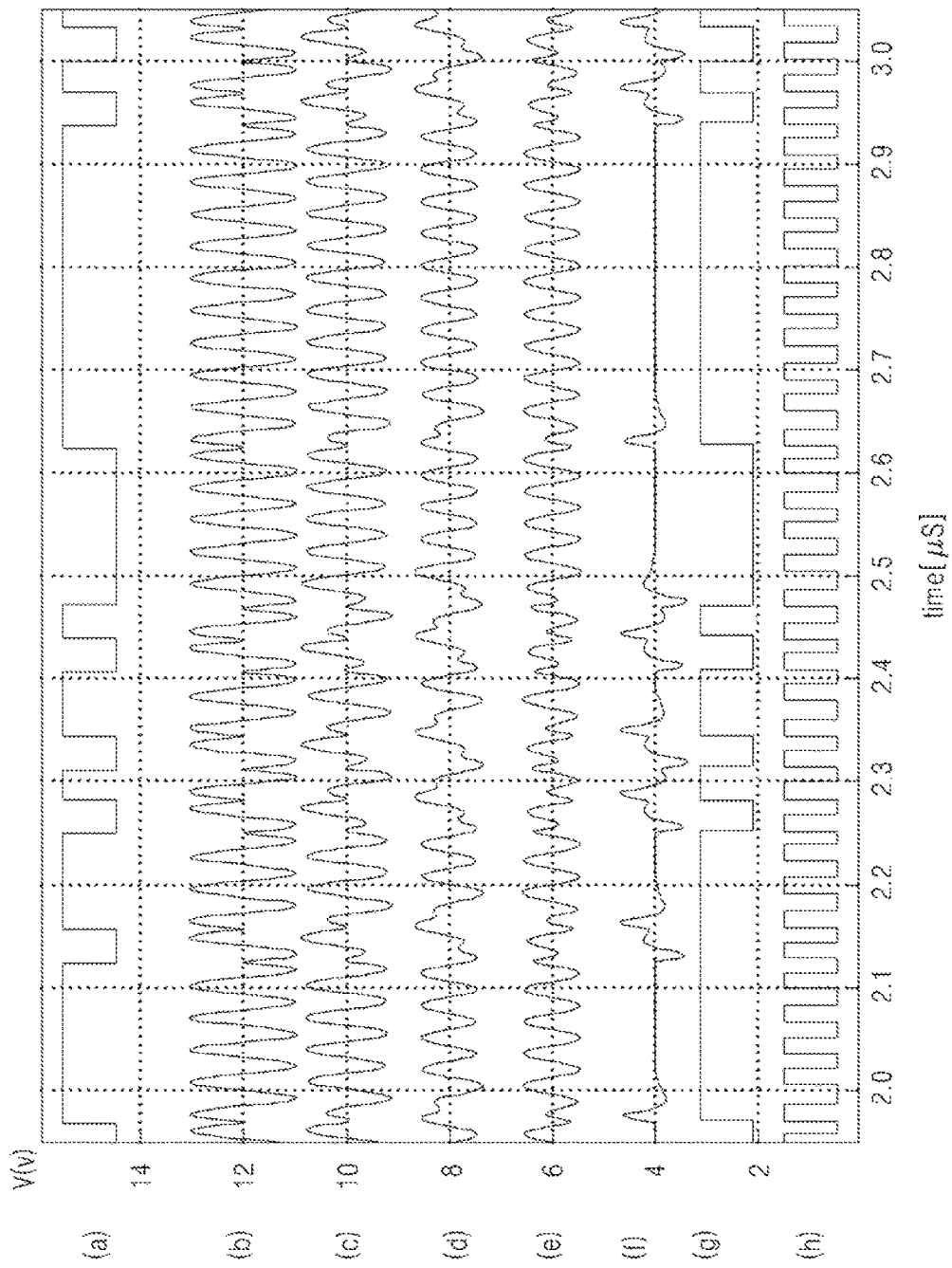
FIG. 2 is a timing diagram illustrating signals such as transmitter side signals that are included random data and a BPSK modulated signal in 32 MHz carrier frequency, and receiver side signals in accordance with an embodiment of the present invention.

Referring additionally now to FIG. 2, the timing diagrams of this invention with the random data of 32 Mbps transfer rate, transmitter side signal to modulate in BPSK using the random data and 32 MHz frequency carrier, and the signals which are processed the BPSK demodulation of receiver side are shown in it.

In the description of graphs from above to below, graph (a) is described as a random data signal to be modulated in transmitter side, graph (b) is described as a phase shift keying modulation signal to be measured in transmitter side, and graph (c) is described as a band-limited BPSK signal through a resonance circuit in receiver side.

Also, graph (d) is described as the delayed analog signal to be delayed with π/2 or ¼ period of carrier frequency from the output of $1^{st}$ order low-pass filter ($1^{st}$ order LPF), graph (e) is described as the analog output signal of $1^{st}$ order high-pass filter ($1^{st}$ order HPF), and graph (f) is described as an analog pulse signal that includes positive pulse and negative pulse to be generated by the sum of the delayed analog signal that is delayed from the output signal of $1^{st}$ order low-pass filter and the analog output signal of $1^{st}$ order high-pass filter for demodulating data.

And also, graph (g) is described as a data signal to be demodulated by latching through Schmitt trigger that has a hysteresis characteristic from an analog pulse signal that is the output of the adder, and finally graph (h) is described as a data clock signal to be recovered.

Each illustrated signal appears in a typically clear signal, and the demodulated signal is confirmed in a precise signal. For a practical technology that is used in 0.18 μm technology, for example, a high speed operation over 1 Gbps can be actualized in the demodulation method for even more speed.

Figure 3:
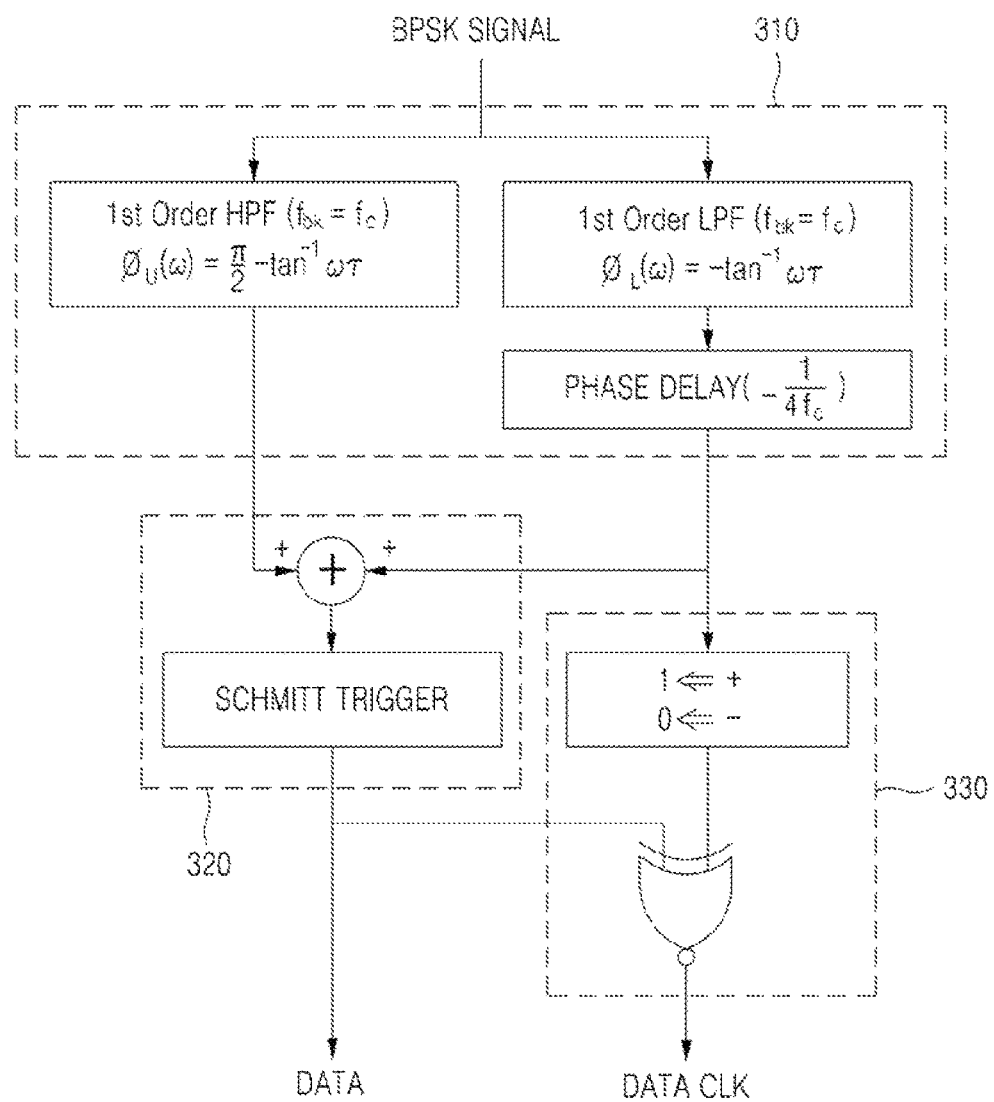
FIG. 3 is a flowchart to describe the demodulation method in an ultra low power wideband non-coherent BPSK demodulator in accordance with an embodiment of the present invention.

Referring additionally now to FIG. 3, the flowchart of this invention for describing a demodulation method to be performed in an ultra low power wideband non-coherent BPSK demodulation circuit is shown in it, and each stage can be conducted through the structure of a BPSK demodulation circuit that describes in FIG. 1.

In stage (310), a lower sideband and an upper sideband are separated from the modulated signal by a $1^{st}$ order LPF and a $1^{st}$ order HPF that separates each sideband analog signals, and this stage outputs a delayed analog signal to be delayed with preset phase from a lower sideband analog signal and an upper sideband analog signal.

In this stage, the lower sideband analog signal is occurred as slow as π/2 or ¼ period of carrier frequency rather than the upper sideband analog signal, and the delayed lower sideband signal is occurred through the delay circuit to delay π/2 or ¼ period of carrier frequency for finding phase changing edge with aligning phase 180° difference between the delayed lower sideband signal and the upper sideband signal.

In stage (320), an analog pulse signal which is constructed with positive and negative pulses, is occurred in phase changing edge by the sum of the analog signals, because the delayed lower sideband and the upper sideband analog signals of stage (310) are aligned in phase 180°.

By latching above analog pulse signal through Schmitt trigger that has a hysteresis characteristic, the digital data can be demodulated.

Finally, in stage (330), a digital clock is recovered by an exclusive-NOR gate whose inputs are a signal that is digitized from the delayed lower sideband analog signal among the outputs of stage (310) by a comparator, and the digital data that is demodulated in stage (320).

By the illustrative embodiment of this invention, the non-coherent BPSK demodulation circuit and its method that work to transmit a wideband digital data, in an ultra low power and simple circuitry, are offered.

On top of that, the demodulation method to implement in digital communication and mobile communication device for consuming ultra low power is provided, also it applies a system on chip (SoC) in low cost.

Through the embodiment of the invention, a non-coherent BPSK demodulation method can be embodied in program instruction forms to be conducted by various computing methods, and saved in a computer readable media. The computer readable media can be included in stand alone or combination with data structure, data file and program instruction. The program instruction to be saved in above media will be possible to use what is constructed and specially designed, or announced by ordinary skilled of computer software for the embodiment. The examples of the computer readable recording media are a floppy disk, a hard disk, a magnetic media such as magnetic tape, an optical media such as DVD and CD-ROM, a magneto-optical media such as a floptical disk, and a particularly designed hardware device such as RAM, ROM and a flash memory to be saved and performed by program instruction. In the example of program instruction, it includes with a machine code that is constructed by a compiler, also a high level language to be executed using an interpreter by a computer. Above hardware device is organized to be operated into more than one software module for performing the operation of the embodiment, and the opposite is also.

While the invention has been particularly shown and described with reference to the preferred embodiments in the system, the structure, the device and the circuit thereof, it will be understood by those skilled in the art that the foregoing and other changes in form, and details may be made therein without departing from the spirit and scope of the invention.

Therefore, another embodiments, another examples, and claims that are equivalent, are covered in the scope of following claims.

What is claimed is:

1. In the circuit structure of an ultra low power wideband non-coherent binary phase shift keying (BPSK) demodulator using first order sideband filters with 180 degree alignment, the ultra low power wideband non-coherent binary phase shift keying demodulation circuit comprises:

a sideband separation and lower sideband signal delay unit to output an upper sideband analog signal and a phase delayed analog signal to be delayed with preset phase from a lower sideband analog signal, when a modulation signal in the input of the sideband separation and lower sideband signal delay unit is divided to a lower sideband and an upper sideband by $1^{st}$ order filters whose cutoff frequency is same as carrier frequency;

a data demodulation unit to demodulate digital data through a hysteresis circuit that latches an analog pulse signal that appears in the phase changing edge of BPSK modulation signal and also is the sum of the phase delayed lower sideband analog signal and the upper sideband analog signal, in accordance with the analog signals being set to phase 180°; and a data clock recovery unit to recover data clock using a digitized signal from the phase delayed lower sideband analog signal and the demodulated digital data signal, wherein the sideband separation and lower sideband signal delay unit comprises:

a $1^{st}$ order high-pass filter ($1^{st}$ order HPF) whose cutoff frequency is same as the carrier frequency configured to isolate upper sideband from the modulation signal;

a $1^{st}$ order low-pass filter ($1^{st}$ order LPF) whose cutoff frequency is same as the carrier frequency configured to isolate lower sideband from the modulation signal; and a delay circuit to delay with preset phase from a lower sideband analog signal that is the output of the $1^{st}$ order LPF, the data demodulation unit comprises:

an adder to generate an analog pulse signal to appear in the phase changing edge of the modulation signal, and the edge being caused by the sum of analog signals which are the phase delayed lower sideband analog signal and the upper sideband analog signal in accordance with phase difference between the analog signals set to phase 180°; and a Schmitt trigger that is a hysteresis circuit to demodulate digital data by latching the analog pulse signal, the data clock recovery unit comprises:

a comparator to digitize the phase delayed lower sideband analog signal; and an exclusive-NOR gate to compare the digitized phase delayed lower sideband analog signal with the demodulated digital data signal, wherein the digital data is demodulated easily by latching the analog pulse signal to include positive and negative pulses that are generated by adding signals that are the upper sideband analog signal and the phase delayed lower sideband analog signal that is delayed more ¼ period of the carrier frequency by the delay circuit to cause the analog signals to be aligned in phase 180°, through the hysteretic circuit in accordance with the lower sideband analog signal that is separated from the $1^{st}$ order LPF slower than π/2 or ¼ period of the carrier frequency rather than the upper sideband analog signal that is separated from the $1^{st}$ order HPF, and the phase difference of the sideband analog signals whose center is the same as the carrier frequency fixed to ¼ period of the carrier frequency in a range from the upper sideband to the lower sideband.

2. The ultra low power wideband non-coherent BPSK demodulation circuit of claim 1, wherein the data demodulation unit comprises the adder and the Schmitt trigger that is the hysteresis circuit, wherein the digital data is demodulated by latching the analog pulse signal that consists of the positive and negative pulses which appear in the phase changing edge based on the difference the analog signals, in accordance with aligning in phase 180° difference between the phase delayed lower sideband analog signal and the upper sideband analog signal.

3. The ultra low power wideband non-coherent BPSK demodulation circuit of claim 1, wherein the data clock recovery unit comprises the comparator and the exclusive-NOR gate, wherein the data clock is recovered through the result of the exclusive-NOR gate that compares the demodulated digital data signal and the digitized delayed lower sideband analog signal.

4. In the flowchart of an ultra low power wideband non-coherent binary phase shift keying (BPSK) demodulation method using first order sideband filters with phase 180 degree alignment, the ultra low power wideband non-coherent binary phase shift keying demodulation method comprises:

a sideband separation and lower sideband signal delay step to output an upper sideband analog signal and a phase delayed analog signal to be delayed with preset phase from a lower sideband analog signal, when a modulation signal in the input of the sideband separation and lower sideband signal delay step is divided to a lower sideband and an upper sideband by $1^{st}$ order filters whose cutoff frequency is same as carrier frequency;

a data demodulation step to demodulate digital data through a hysteresis circuit that latches an analog pulse signal that appears in a phase changing edge of BPSK modulation signal and also is the sum of the phase delayed lower sideband analog signal and the upper sideband analog signal, in accordance with the signals are set to phase 180°; and a data clock recovery step to recover data clock using a digitized signal from the phase delayed lower sideband analog signal and the demodulated digital data signal, wherein the sideband separation and lower sideband signal delay step comprises:

a step to isolate the upper sideband from the modulation signal by a $1^{st}$ order high-pass filter ($1^{st}$ order HPF) whose cutoff frequency is the same as the carrier frequency;

a step to isolate the lower sideband from the modulation signal by $1^{st}$ order low-pass filter ($1^{st}$ order LPF) whose cutoff frequency is the same as the carrier frequency; and a delay step to delay with the preset phase from the lower sideband analog signal that is the output of the $1^{st}$ order LPF, the data demodulation step comprises:

a step to generate the analog pulse signal to appear in the phase changing edge of the modulation signal by an adder, and the edge is caused by the sum of the analog signals which are the phase delayed lower sideband analog signal and the upper sideband analog signal in accordance with the phase difference between the analog signals set to phase 180°; and a step to demodulate the digital data through latching the analog pulse signal by the Schmitt trigger that is the hysteresis circuit, the data clock recovery step comprises:

a step to convert a digital signal from the phase delayed lower sideband analog signal by a comparator; and a step to recover the data clock by comparing the phase delayed lower sideband digital signal with the demodulated digital data signal by an exclusive-NOR gate, and to be with emphasis in following characteristics:

wherein the lower sideband analog signal that is from the output of $1^{st}$ order LPF, occurs slower than the lower sideband analog signal by $\pi/2$ or ¼ period of the carrier frequency, and the phase delayed lower sideband signal occurs through the delay step to delay $\pi/2$ or ¼ period of the carrier frequency for finding the phase changing edge with aligning phase 180° difference between the phase delayed lower sideband signal and the upper sideband signal.

* * * * *